United States Patent
He

(10) Patent No.: US 7,327,002 B2
(45) Date of Patent: Feb. 5, 2008

(54) INDUSTRIAL CONTROL CIRCUIT USING A SINGLE-CHIP MICROPROCESSOR

(75) Inventor: Tie-Hai He, Shenzhen (CN)

(73) Assignees: Innocom Technology (Shenzhen) Co., Ltd., Shenzhen, Guangdong Proviince (CN); Innolux Display Corp., Chu-Nan, Miao-Li County (TW)

( * ) Notice: Subject to any disclaimer, the term of this patent is extended or adjusted under 35 U.S.C. 154(b) by 142 days.

(21) Appl. No.: 11/224,157

(22) Filed: Sep. 12, 2005

(65) Prior Publication Data

US 2006/0059378 A1 Mar. 16, 2006

(30) Foreign Application Priority Data

Sep. 10, 2004 (TW) ............................... 93127583 A

(51) Int. Cl.
*H01L 29/76* (2006.01)
*H01L 29/94* (2006.01)
*H01L 31/00* (2006.01)

(52) U.S. Cl. ..................... 257/390; 257/260; 711/103; 711/104; 711/105; 711/154; 713/300; 713/320; 713/375

(58) Field of Classification Search ................ 257/432, 257/431, 299, E27.13, E27.132, 260–261, 257/263, 296, 300, 390, 314, E27.075, E27.102, 257/E27.078, E29.17; 315/387–388; 711/103–105, 711/154; 713/300, 320, 375, 400
See application file for complete search history.

(56) References Cited

U.S. PATENT DOCUMENTS 4,070,710 A 1/1978 Sukonick et al.
4,255,789 A * 3/1981 Hartford et al. ............ 701/108

* cited by examiner

*Primary Examiner*—Mary Wilczewski
*Assistant Examiner*—Thanh Y. Tran
(74) *Attorney, Agent, or Firm*—Wei Te Chung

(57) ABSTRACT

An industrial control circuit includes: a first isolation circuit (22) for converting an analog signal to a low level voltage; a single-chip microprocessor SCM (23) for receiving the low level voltage from the first isolation circuit, and generating a control signal according to the low level voltage; and a second isolation circuit (24) for converting the control signal to a high level voltage. The SCM has at least thirty-two input/output (I/O) channels. Because the SCM used in the industrial control circuit has at least thirty-two I/O channels, the industrial control circuit can synchronously deal with sixteen-bit bidirectional communication.

8 Claims, 6 Drawing Sheets

US 7,327,002 B2

INDUSTRIAL CONTROL CIRCUIT USING A SINGLE-CHIP MICROPROCESSOR

FIELD OF THE INVENTION

The present invention relates to control circuits, and more particularly to an industrial control circuit incorporating a single-chip microprocessor.

BACKGROUND

In order to improve efficiency and realize mass production in the field of industrial manufacturing, programmable logic controllers (PLCs), personal computers (PCs), and single-chip microprocessors (SCMs) are generally applied in all kinds of industrial control circuits. However, PLCs are expensive, and the PCs are bulky. SCMs are best suited for use in an industrial control circuit, when the considerations of cost and bulk are paramount. In general, an SCM mainly includes an integrated circuit read-only memory (ROM) for program storage, an integrated circuit random-access memory (RAM) or scratch pad memory for alterable operand storage, and integrated circuit logic. In addition, an SCM may further include serial data communications, pulse modulated communications, eight bit instruction bytes, sixteen-bit operand words, shared input/output (I/O) channels, and/or other selected components.

As shown in FIG. 6, a typical industrial control circuit 10 includes an SCM 13, an interface circuit 14, a digital I/O circuit 18, and an analog I/O circuit 15. The analog I/O circuit 15 includes a digital to analog (D/A) conversion circuit 17 and an analog to digital (A/D) conversion circuit 16. The SCM 13 includes a computer, a RAM, a ROM (EPROM 2K×8), and twenty-seven I/O channels providing six digital signal bidirectional communication channels and eight analog signal bidirectional communication channels. In the illustrated industrial control circuit 10, the SCM 13 is an SCM8748 microprocessor. Alternatively, the SCM 13 may be an SCM8748, an SCM8749, an SCM8751, an SCM8048 or an SCM8049 microprocessor.

In operation, analog signals or digital signals may be input to the industrial control circuit 10 from an external circuit (not shown). If a digital signal is input, the digital I/O circuit 18 receives the digital signal and outputs the digital signal to the SCM 13 via an optoisolator 181. Then the SCM 13 generates a control signal according to the digital signal, and outputs the control signal to an external electrical device (not shown). If an analog signal is input, the analog I/O circuit 15 receives the analog signal, transforms the analog signal into a digital signal via the digital to analog (A/D) 16, and outputs the digital signal to the SCM 13. The SCM 13 generates a control signal according to the received digital signal, and outputs the control signal to the digital to analog (D/A) conversion circuit 17. The digital to analog (D/A) conversion circuit 17 transforms the digital signal into an analog signal, and outputs the analog signal to an external load (not shown) via the analog I/O circuit 15.

Because the industrial control circuit 10 only provides six digital signal bidirectional communication channels and eight analog signal bidirectional communication channels, the industrial control circuit 10 is not suitable for complicated communication in the field of industrial control. For example, the industrial control circuit 10 cannot synchronously deal with an application requiring sixteen-bit bidirectional communication.

It is desired to provide an industrial control circuit which overcomes the above-described deficiencies.

SUMMARY

An industrial control circuit includes a first isolation circuit for converting an analog signal to a low level voltage, an SCM for receiving the low level voltage from the first isolation circuit and generating a control signal according to the low level voltage, and a second isolation circuit for converting the control signal to a high level voltage. The SCM has at least thirty-two I/O channels.

Because the SCM used in the industrial control circuit has at least thirty-two I/O channels, the industrial control circuit can synchronously deal with sixteen-bit bidirectional communication.

Other advantages and novel features will become more apparent from the following detailed description when taken in conjunction with the accompanying drawings, in which:

DETAILED DESCRIPTION OF PREFERRED EMBODIMENTS

Figure 1:
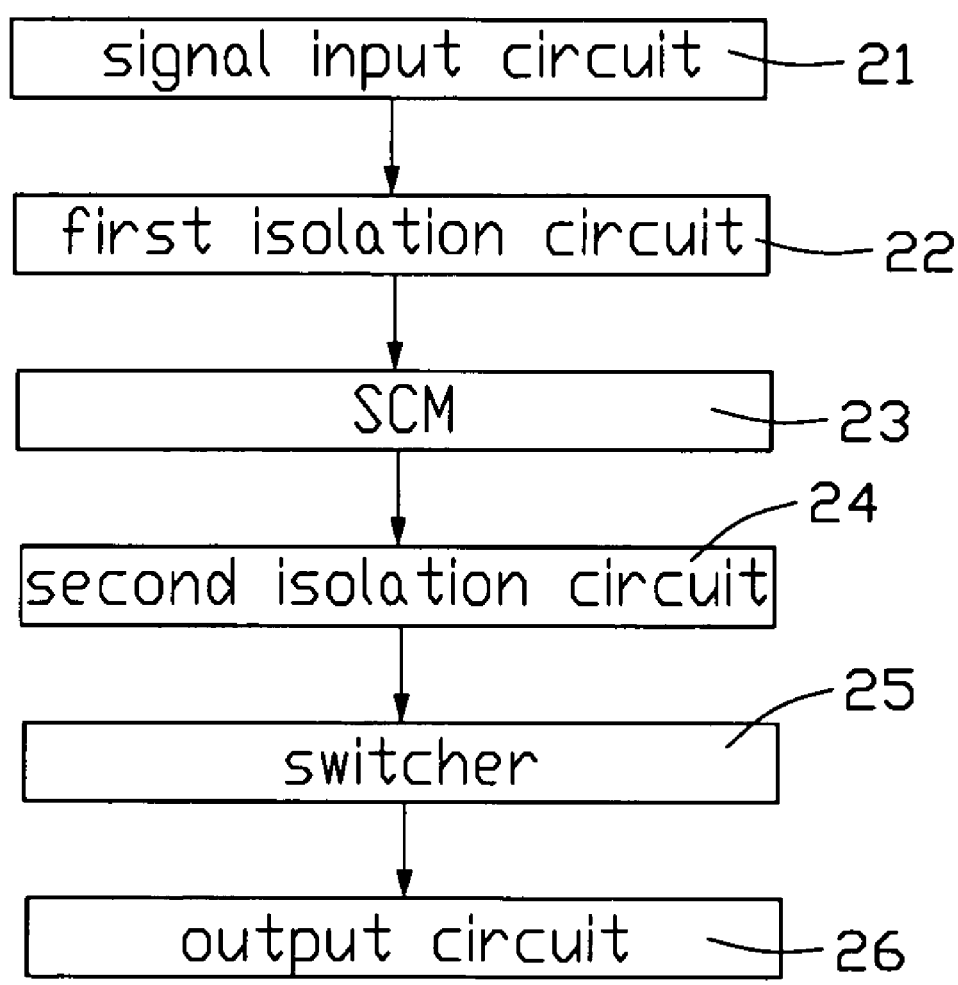
FIG. 1 is a block diagram of an industrial control circuit in accordance with a preferred embodiment of the present invention.

FIG. 1 is a block diagram of an industrial control circuit in accordance with a preferred embodiment of the present invention. The industrial control circuit 20 includes a signal input circuit 21 for receiving an analog signal from an external circuit (not shown), a first isolation circuit 22 for converting the analog signal to a low level voltage, an SCM 23 for receiving the low level voltage from the first isolation circuit 22 and generating a control signal according to the low level voltage, a second isolation circuit 24 for converting the control signal to a high level voltage, a switcher 25 used to switch an external load circuit (not shown) on and off according to the high level voltage, and an output circuit 26 for connecting the switcher 25 and the external load circuit via the signal input circuit 21. The SCM has at least thirty-two I/O channels.

Figure 2:
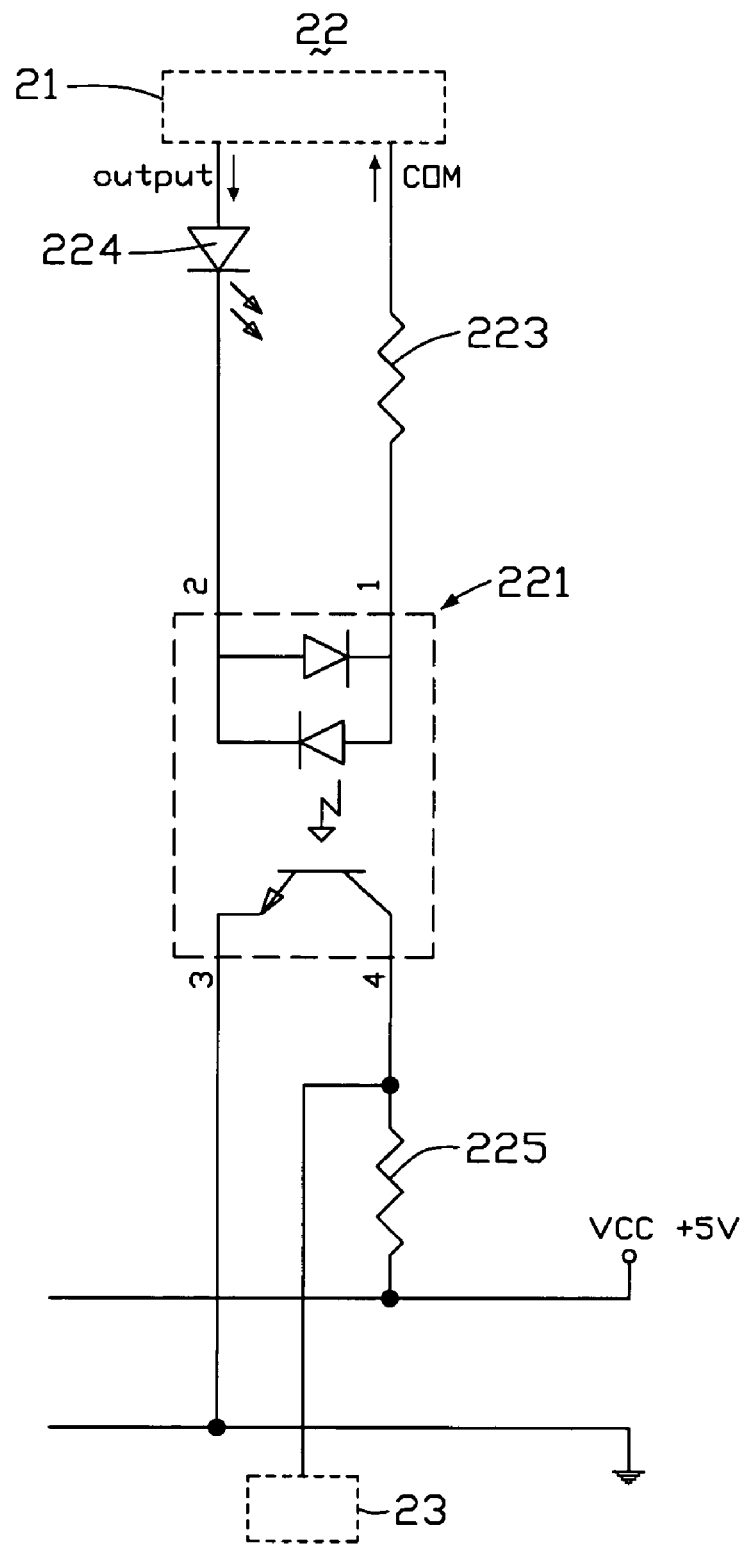
FIG. 2 is a detailed circuit diagram of a first isolation circuit of the industrial control circuit of FIG. 1.

FIG. 2 is a detailed circuit diagram of the first isolation circuit 22. The first isolation circuit 22 includes an optoisolator 221, a light emitting diode (LED) 224, and two resistors 223, 225. The optoisolator 221 includes two input pins 1, 2, a ground pin 3, and an output pin 4. An anode of the LED 224 is connected to the output port of the signal input circuit 21. A cathode of the LED 224 is connected to the input pin 2 of the optoisolator 221. The input pin 1 of the optoisolator 221 is connected to a COM port of the signal input circuit 21 via the resistor 223. The ground pin 3 of the optoisolator 221 is connected to ground. The output pin 4 of the optoisolator 221 is connected to an electrical source VCC (+5V) via the resistor 225. The SCM 23 is connected to a node between the resistor 225 and the output pin 4 of the optoisolator 221. The optoisolator 221 may be a TLP5241 optoisolator.

Figure 3:
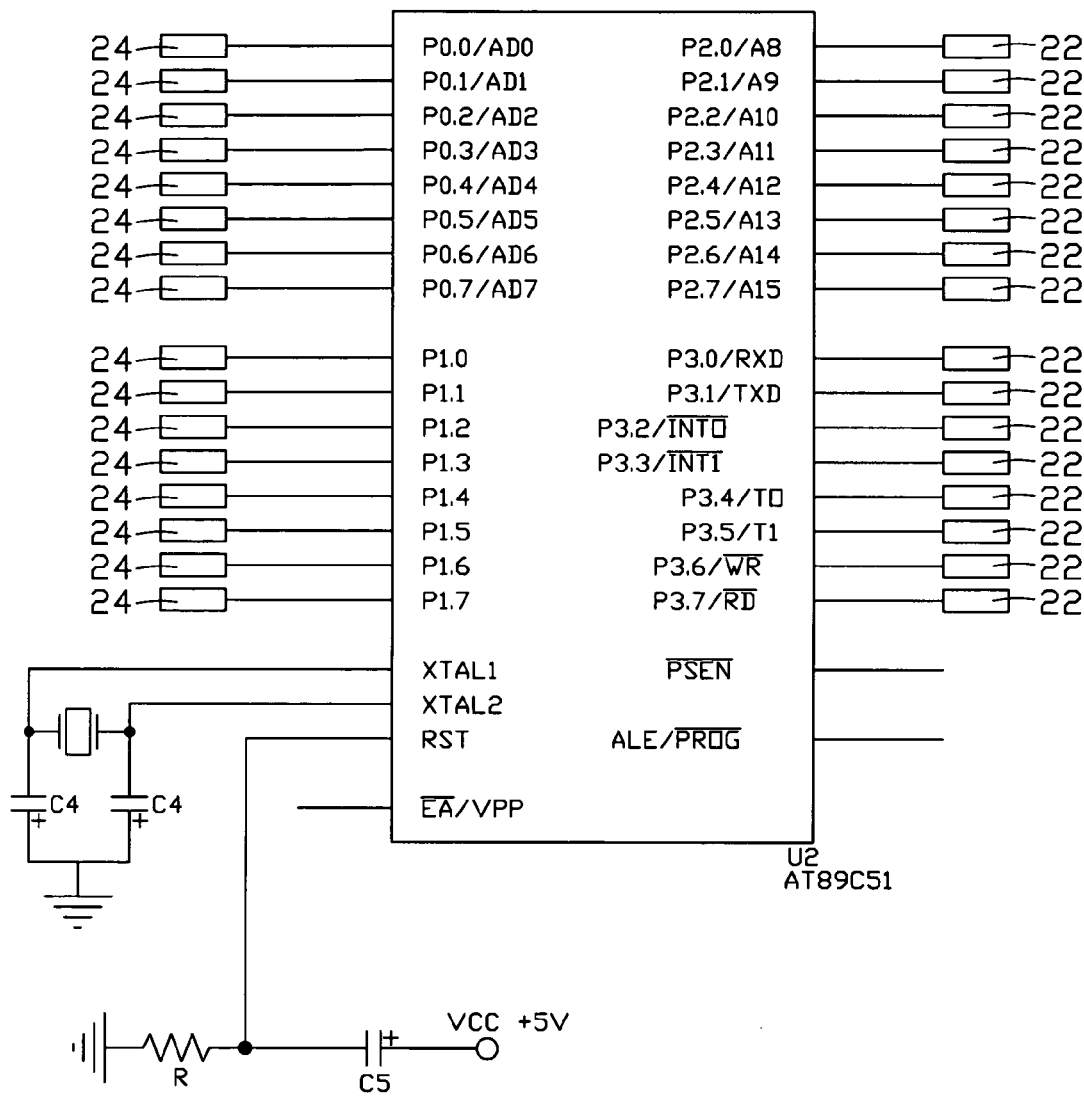
FIG. 3 is a detailed circuit diagram of an SCM of the industrial control circuit of FIG. 1.

FIG. 3 is a detailed circuit diagram of the SCM 23. In the preferred embodiment, the SCM 23 is an AT89C51 microprocessor. In alternative embodiments, the SCM 23 may for example be an AT89C52, an AT89C55WD, an AT89LV51, an AT89LV52, or an AT89LV55 microprocessor. The SCM 23 includes a computer, a RAM, a ROM, and thirty-two I/O channels for providing sixteen-bit digital signal bidirectional communication channels. Each of the I/O channels P2.0-P2.7 and P3.0-P3.7 is connected to the first isolation circuit 22. Each of the I/O channels P0.0-P0.7 and P1.0-P1.7 is connected to the second isolation circuit 24.

Figure 4:
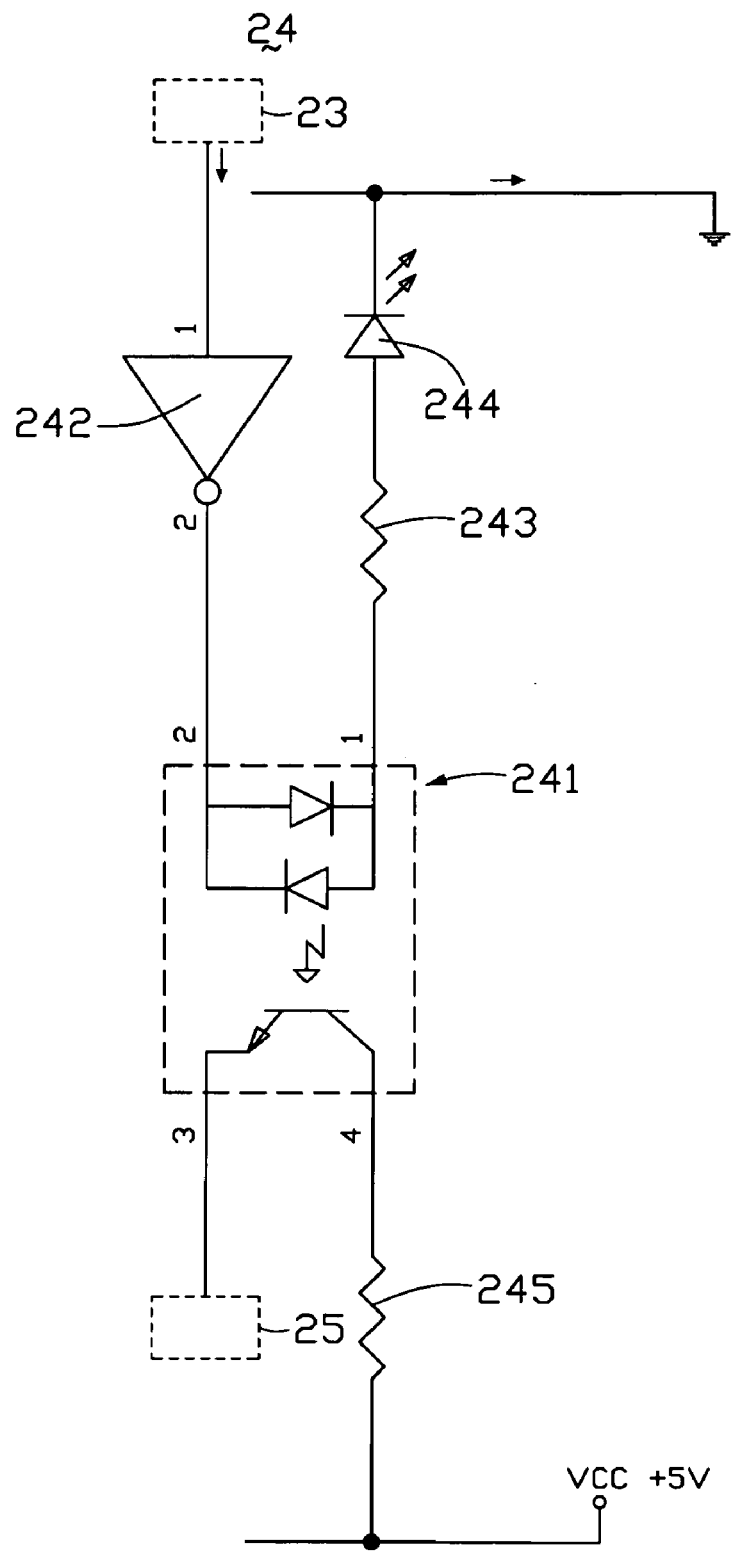
FIG. 4 is a detailed circuit diagram of a second isolation circuit with an optoisolator of the industrial control circuit of FIG. 1.

FIG. 4 is a detailed circuit diagram of the second isolation circuit 24. The second isolation circuit 24 includes an optoisolator 241, an LED 244, a inverter 242, and two resistors 243, 245. The optoisolator 241 includes two input pins 1, 2, a ground pin 3, and an output pin 4. A cathode of the LED 244 is connected to ground. An anode of the LED 244 is connected to the input pin 1 of the optoisolator 241 via the resisitance 243. The input pin 2 of the optoisolator 241 is connected to an output port of the inverter 242. An input port of the inverter 242 is connected to the SCM 23. The output pin 4 of the optoisolator 241 is connected to an electrical source VCC (+5V) via the resistor 245. The ground pin 3 of the optoisolator 241 is connected to the switcher 25. The optoisolator 221 may be a TLP5241 optoisolator.

Figure 5:
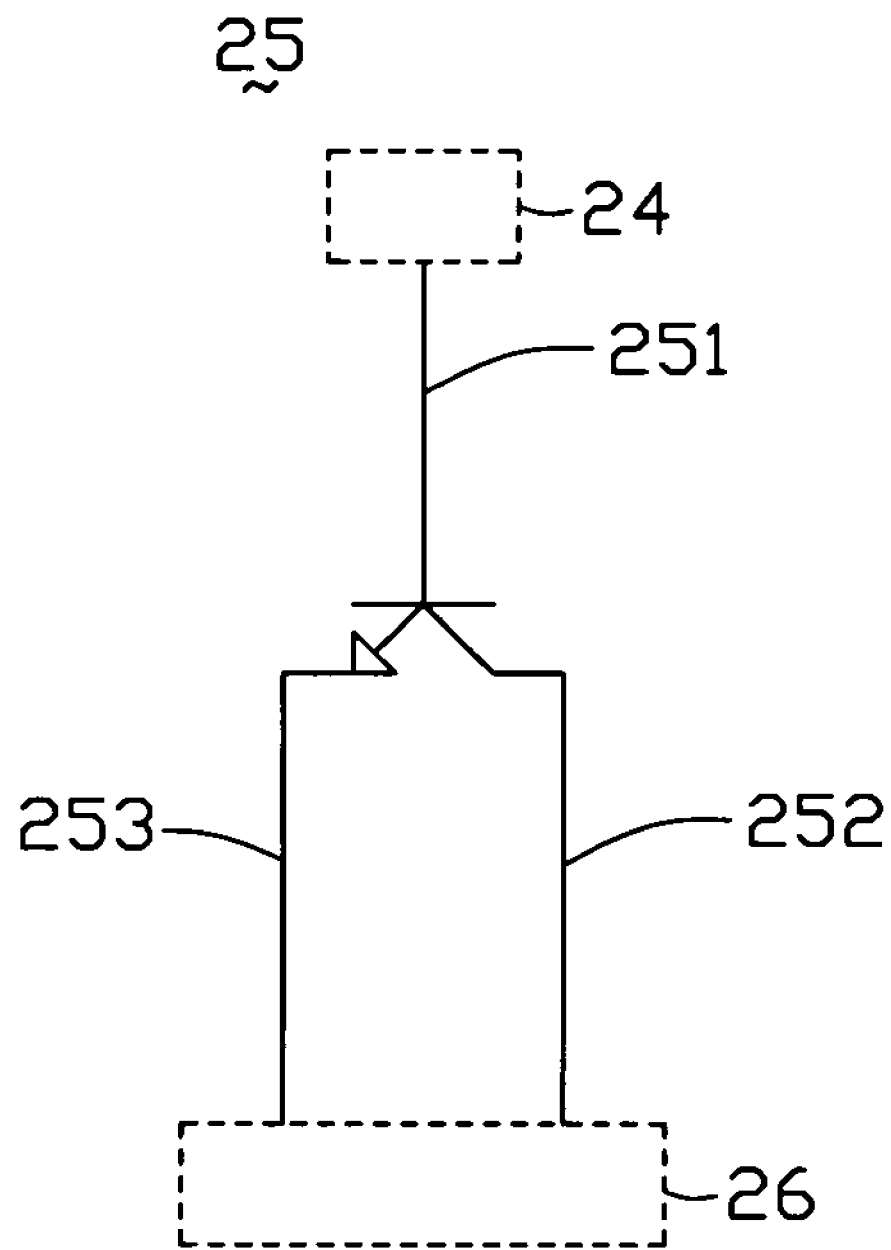
FIG. 5 is a detailed circuit diagram of a switcher of the industrial control circuit of FIG. 1.
Figure 6:
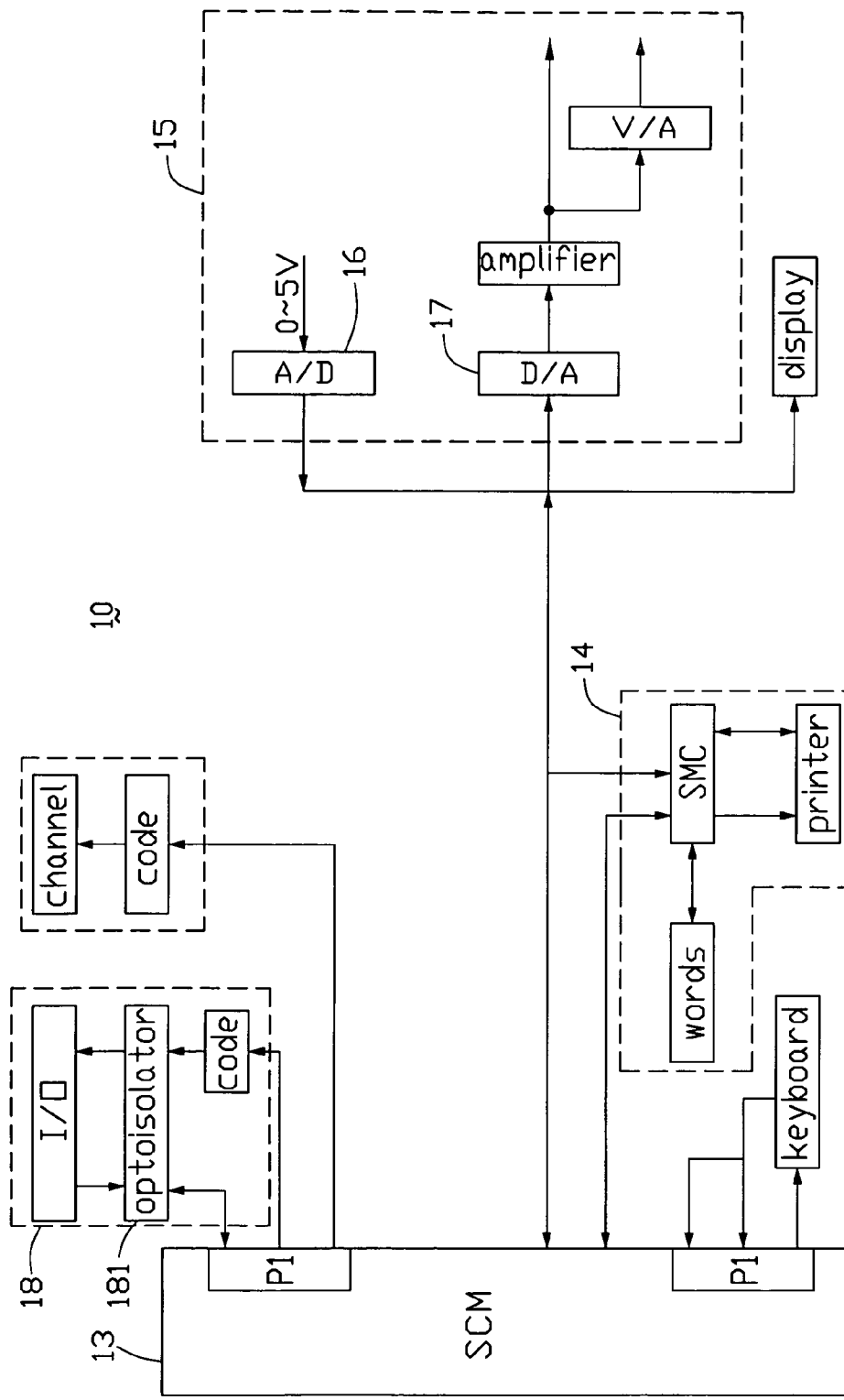
FIG. 6 is a circuit diagram of a conventional industrial control circuit.

FIG. 5 is a detailed circuit diagram of the switcher 25. The switcher 25 is a high-power transistor, which includes a gate electrode 251, a source electrode 252, and a drain electrode 253. The gate electrode 251 is connected to the second isolation circuit 24. The source electrode 252 and the drain electrode 253 are connected to the output circuit 26. The maximum driving current of the switcher 25 is 0.5 amperes (24V DC).

Referring to FIGS. 1-5, when the industrial control circuit 20 is in an operating state, an analog signal from the external circuit sequentially passes through the output port of the signal input circuit 21, the LED 224, the input pins 2, 1 of the optoisolator 221, the resistor 223 and the COM port of the signal input circuit 21. After receiving the analog signal, the output pin 4 of the optoisolator 221 electrically connects internally to the ground pin 3 of the optoisolator 221. As a result, the output pin 4 of the optoisolator 221 generates a low level voltage and applies it to the SCM 23. After that, the SCM 23 generates a control signal according to the low level voltage received from the output pin 4 of the optoisolator 221, and outputs the control signal to the second isolation circuit 24. The control signal from the SCM 23 sequentially passes through the inverter 242, the input pins 2, 1 of the optoisolator 241, the resistor 243, the LED 244, and ground. After receiving the control signal, the output pin 4 of the optoisolator 241 electrically connects internally to the ground pin 3 of the optoisolator 241. As a result, the output pin 4 of the optoisolator 241 generates a high level voltage and applies it to the switcher 25. The high level voltage is used to control the switcher 25 on and off. The output circuit 26 is used to connect the switcher 25 and an external circuit load, so that the switcher 25 can switch the external circuit load on and off.

Unlike the conventional industrial control circuit which only provides six digital signal bidirectional communication channels and eight analog signal bidirectional communication channels, the SCM 23 used in the industrial control circuit 20 has thirty-two I/O channels, which can synchronously deal with sixteen-bit bidirectional communication. Furthermore, when current flows through the LEDs 224, 244, it is convenient to observe that the LEDs 224, 244 are illuminated. This enables an operator to readily confirm that the industrial control circuit 20 is in a working state.

It is to be understood, however, that even though numerous characteristics and advantages of the preferred embodiments have been set out in the foregoing description, together with details of the structures and functions of the embodiments, the disclosure is illustrative only; and that changes may be made in detail, especially in matters of shape, size, and arrangement of parts within the principles of the invention to the full extent indicated by the broad general meaning of the terms in which the appended claims are expressed.

What is claimed is:

1. An industrial control circuit, comprising:
 a first isolation circuit for converting an analog signal to a low level voltage;
 a single-chip microprocessor (SCM) for receiving the low level voltage from the first isolation circuit, and generating a control signal according to the low level voltage; and
 a second isolation circuit for directly receiving the control signal and converting the control signal to a high level voltage;
 wherein the SCM has at least thirty-two input/output (I/O) channels, which can synchronously deal with at least sixteen-bit bidirectional communication.

2. The industrial control circuit as claimed in claim 1, further comprising a signal input circuit for receiving the analog signal from an external circuit and outputting the analog signal to the first isolation circuit.

3. The industrial control circuit as claimed in claim 1, further comprising a switcher used to switch an external load circuit on and off according to the high level voltage.

4. The industrial control circuit as claimed in claim 3, wherein the switcher is a high-power transistor.

5. The industrial control circuit as claimed in claim 3, further comprising an output circuit for electrically connecting the switcher and the external load circuit.

6. The industrial control circuit as claimed in claim 1, wherein the first isolation circuit comprises a light emitting diode (LED).

7. The industrial control circuit as claimed in claim 1, wherein the second isolation circuit comprises a light emitting diode (LED).

8. The industrial control circuit as claimed in claim 1, wherein the first and second isolation circuits each comprise an optoisolator.

* * * * *